US012537686B2

(12) United States Patent
Pierrepont et al.

(10) Patent No.: US 12,537,686 B2
(45) Date of Patent: Jan. 27, 2026

(54) SIP SERVER DEFENCE AGAINST DENIAL OF SERVICE

(71) Applicant: MICROSOFT TECHNOLOGY LICENSING, LLC, Redmond, WA (US)

(72) Inventors: Timothy James Pierrepont, London (GB); Thomas Eric Bull, Kendal (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 130 days.

(21) Appl. No.: 18/513,479

(22) Filed: Nov. 17, 2023

(65) Prior Publication Data

US 2025/0097037 A1 Mar. 20, 2025

(30) Foreign Application Priority Data

Sep. 18, 2023 (GB) ...................................... 2314252

(51) Int. Cl.
*H04L 9/32* (2006.01)
*H04L 9/40* (2022.01)

(52) U.S. Cl.
CPC .......... *H04L 9/3213* (2013.01); *H04L 9/3271* (2013.01); *H04L 63/1458* (2013.01)

(58) Field of Classification Search
CPC .. H04L 9/3213; H04L 9/3271; H04L 63/1458
USPC ....................................................... 713/159
See application file for complete search history.

(56) References Cited

U.S. PATENT DOCUMENTS

| 8,203,426 | B1* | 6/2012 | Hirschfeld | ......... | G07C 9/00571 |
| | | | | | 713/168 |
| 8,804,697 | B1* | 8/2014 | Capper | ................. | H04L 63/029 |
| | | | | | 370/352 |
| 8,966,619 | B2* | 2/2015 | Ormazabal | ......... | H04L 63/1408 |
| | | | | | 726/25 |
| 9,252,959 | B2* | 2/2016 | Barriga | ................. | H04W 12/06 |
| 9,755,834 | B1* | 9/2017 | Johnson | ................. | H04L 9/3234 |
| 9,961,066 | B1* | 5/2018 | Kitchen | ............. | H04L 63/0807 |
| 11,741,249 | B2* | 8/2023 | Joshi | ..................... | H04L 9/3242 |
| | | | | | 713/165 |
| 2007/0150934 | A1* | 6/2007 | Fiszman | .............. | H04L 63/102 |
| | | | | | 726/1 |
| 2008/0226047 | A1 | 9/2008 | Reumann | | |

(Continued)

OTHER PUBLICATIONS

"Echo and Request-Tag; draft-ietf-core-echo-request-tag-00.txt", Oct. 30, 2017, 17 pages.

(Continued)

*Primary Examiner* — Thanh T Le
(74) *Attorney, Agent, or Firm* — Han Gim; Newport IP, LLC (57) ABSTRACT

A session initiation protocol (SIP) server contributes to defending against denial of service attacks. It receives, from a sending SIP endpoint in a communications network, such as a 5G communications network, a request to establish a communications session with a destination SIP endpoint in the communications network; computes a token from a cryptographic secret and a property of the request; drops the request and forms a challenge message comprising the token. The SIP server sends the challenge message to the sender to trigger a second request from the sender comprising the token.

19 Claims, 6 Drawing Sheets

(56) References Cited

U.S. PATENT DOCUMENTS

| | | | |
|---|---|---|---|
| 2012/0059897 A1* | 3/2012 | Barriga | H04L 9/3271 |
| | | | 709/206 |
| 2012/0106727 A1* | 5/2012 | Kaushal | H04Q 3/0016 |
| | | | 379/211.01 |
| 2012/0180119 A1* | 7/2012 | Bessis | H04L 9/3271 |
| | | | 726/11 |
| 2016/0344765 A1* | 11/2016 | Shiell | H04L 63/1458 |
| 2022/0345466 A1* | 10/2022 | Field | H04W 12/02 |
| 2023/0308475 A1* | 9/2023 | Pane | H04L 63/0435 |
| 2024/0338471 A1* | 10/2024 | Agrawal | G06F 21/6218 |
| 2025/0056229 A1* | 2/2025 | Edge | H04B 7/18593 |

OTHER PUBLICATIONS

Handley, et al., "Steps towards a DoS-resistant internet architecture", FDNA '04: Proceedings of the ACM SIGCOMM workshop on Future directions in network architecture, Aug. 30, 2004, pp. 49-56.

Hummen, et al., "Tailoring end-to-end IP security protocols to the Internet of Things", 21st IEEE International Conference on Network Protocols (ICNP), Oct. 7, 2013, pp. 1-10.

International Search Report Received in PCT Application No. PCT/US2024/042845, mailed on Dec. 2, 2024, 16 pages.

\* cited by examiner

SIP SERVER DEFENCE AGAINST DENIAL OF SERVICE

CROSS-REFERENCE TO RELATED APPLICATION(S)

This non-provisional utility application claims priority to UK patent application number 2314252.4 entitled "SIP SERVER DEFENSE AGAINST DENIAL OF SERVICE" and filed on 18 Sep. 2023, which is incorporated herein in its entirety by reference.

BACKGROUND

Denial of service attacks occur where a malicious party floods a communications network resource with requests. Because of the flood of requests one or more of the communications network resources become overloaded and are unable to deal with legitimate requests.

Distributed denial of service attacks occur where the malicious party causes the flood of requests to originate, or appear to originate, from many different sources. This type of attack is hard to deal with since each individual source may be sending a non-suspicious volume of traffic.

The embodiments described below are not limited to implementations which solve any or all of the disadvantages of known ways of mitigating denial of service attacks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a way of statelessly filtering denial of service traffic. Because the method is stateless information from a core of the communications network such as user credentials does not have to be obtained so that the method is lightweight, scalable and deployable at the edge of a communications network.

In various examples, a session initiation protocol (SIP) server contributes to defending against denial of service attacks. It receives, from a sending SIP endpoint in a communications network a request to establish a communications session with a destination SIP endpoint in the communications network; computes a token from a cryptographic secret and a property of the request; drops the request and forms a challenge message comprising the token. The SIP server sends the challenge message to the sender to trigger a second request from the sender comprising the token. In response to receipt of the second request, the SIP server checks the second request comprises the token and only in response to success of the checking, forwards the second request towards a core of the communications network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

One approach to dealing with a denial of service attack is to discard the attack traffic in such a way as to leave the protected resource unaffected. Two key challenges are sorting the attack traffic from the legitimate traffic, and building a system for doing the sorting which is itself not vulnerable to overload. These challenges are magnified where the impact of dropping good traffic is high, such as in communications networks, including telecommunications networks.

Consider a situation where a voice over internet protocol (VOIP) communications network has protected servers behind edge servers. The edge servers are connected to the public internet and therefore may experience a DoS attack. During the denial of service attack a flood of requests, such as session initiation protocol SIP requests are received at one of the edge servers which may be a SIP server. The flood of SIP requests may be received from a plurality of sources, such as a legitimate source and a malicious, unauthorized source. In the case of a distributed denial of service attack there are a plurality of malicious sources. The flood of requests overwhelms the SIP server and leads to loss of functionality.

In order to mitigate a denial of service attack one option is to rate limit the requests incoming to the attacked communications network node but this has a disadvantage that the legitimate traffic is dropped. Another option is to issue user or application aware challenges to incoming requests. The data required to do this (such as the usernames and passwords) are typically held in the protected core of the network. Forwarding packets to the core causes the core to do work and so advances the DoS attacker's goals. Migrating the credentials to the edge is insecure, and implementing per-user challenges is significant CPU work, which again advances the DoS attacker's goals. The inventors have recognized that a preferable filter would be a challenge which is as simple as possible, and requires no per-user information.

The inventors have recognized that in many denial of service attacks, dumb bots or other dumb devices send a flood of nonsense to the attack target (such as a SIP server) to try to overwhelm the attack target. A dumb bot or other dumb device is a communications network node that is capable of repeatedly generating and issuing SIP requests and which otherwise has no understanding of SIP. Since a dumb bot or other dumb device does not understand SIP when it receives a SIP message it takes no action. The inventors have devised an efficient, effective way of mitigating denial of service attacks made by dumb bots or other dumb devices that do not understand SIP or which are unable to respond to certain types of SIP message. The method is stateless in that it does not use credentials or other data that has to be retrieved from another location such as a core of the communications network. Having a stateless method improves latency and efficiency. The method is readily scalable which facilitates mitigation of denial of service attacks since the method can be scaled to match a denial of service attack as it grows.

Consider a challenge where a user sends a request, a communications network node challenges them to prove who they are, and the user submits that proof. As mentioned above, checking per-user information in this way is disadvantageous for a number of reasons. In contrast, the present technology issues a basic challenge, which can be met without knowing any cryptographic secrets or passwords. All that is needed is the ability to follow the rules of SIP. Responding like any SIP endpoint would is all the verification the challenge is asking for. A dumb load-generator is unable to meet the challenge, and a spoofed source won't even see the challenge.

In some examples, while no cryptographic secret is shared between user and server, a cryptographic secret is shared between servers. That means it is possible to calculate a challenge based on this, which users can't guess, but which other servers can check.

In various examples the challenge is something that any well behaving device knows how to handle already. This means something a communications network node would do anyway if the node were following the regular SIP protocol specification, as laid out in request for comments RFC3261. In this way the present technology is compatible with existing SIP communications network nodes.

A DOS attack succeeds by utilizing the target's resources, such that it can't perform useful work. Sorting attack traffic from good traffic also costs resources, and so advances the attack. For example, asking a user for a password to verify them typically requires involving more servers, and so increases workload. On the other hand, dumbly dropping random traffic impacts good traffic as well, so also advances the attack. Dropping sources which send a suspicious amount of traffic is effective, but can be defeated by sending non-suspicious traffic loads from many places ("DDOS"). Useful then is to find a defense which can be implemented using minimal knowledge and resources, thus permitting it to be deployed on the edge, and scaled quickly. Such a defense can't be expected to block everything, but if it can filter at least the dumber attacks then it can leave the smarter (but less scalable) layers of defense behind it to handle the rest. Some of the things which may be amenable to a dumb approach are blocking waves from endpoints which are no more intelligent than required to send as much traffic as possible as fast as possible ("load generators"), and endpoints which are spoofing their source in order to evade source rate limits.

In various examples, a method is performed by a SIP server to mitigate denial of service. The SIP server receives, from a sending SIP endpoint in a communications network a request to establish a communications session with a destination SIP endpoint in the communications network. It is not certain, from the point of view of the SIP server, whether the request is legitimate or whether the request is part of a denial of service attack. The SIP server has the option to process the request using a stateless DoS filter in order to filter out the request if it is likely to be from a dumb bot or other malicious entity as now explained.

The SIP server computes a token from the cryptographic secret and a property of the request. By using the cryptographic secret the token becomes difficult for malicious parties to guess since malicious parties do not have the cryptographic secret. The SIP server forms a challenge message comprising the token and sends the challenge message to the sender to trigger a response from the sender comprising the token. In cases where the sender is a dumb bot or other dumb device being used for a denial of service attack, the sender does not respond; because the sender does not understand the SIP challenge message and therefore ignores it. The SIP server, in response to non-receipt of the response takes no action. In this way denial of service is mitigated since the SIP request was sent by an entity unable to respond to the SIP challenge and which is therefore likely to be a dumb device being used in a denial of service attack.

Where the SIP server receives the response it is optionally able to do another check. (In some examples that are described later in this document either the SIP server or any other SIP server with a shared cryptographic secret receives the response.) It optionally checks the response comprises the token and in response to failure of the check drops the request. The SIP server may check the response comprises the token by performing the same token generation and comparing to the received token. This check enables requests sent by malicious parties which have tried unsuccessfully to guess the response to be dropped. Thus denial of service is mitigated. Where the SIP request passes the checks the SIP server forwards the SIP request towards a core of the communications network for processing such as to establish a video call or other communication session. In some cases the SIP request undergoes stateful denial of service checks using data from the core of the network such as user credentials; this is performed by the next layer along in the communications network not by the SIP server.

Figure 1:
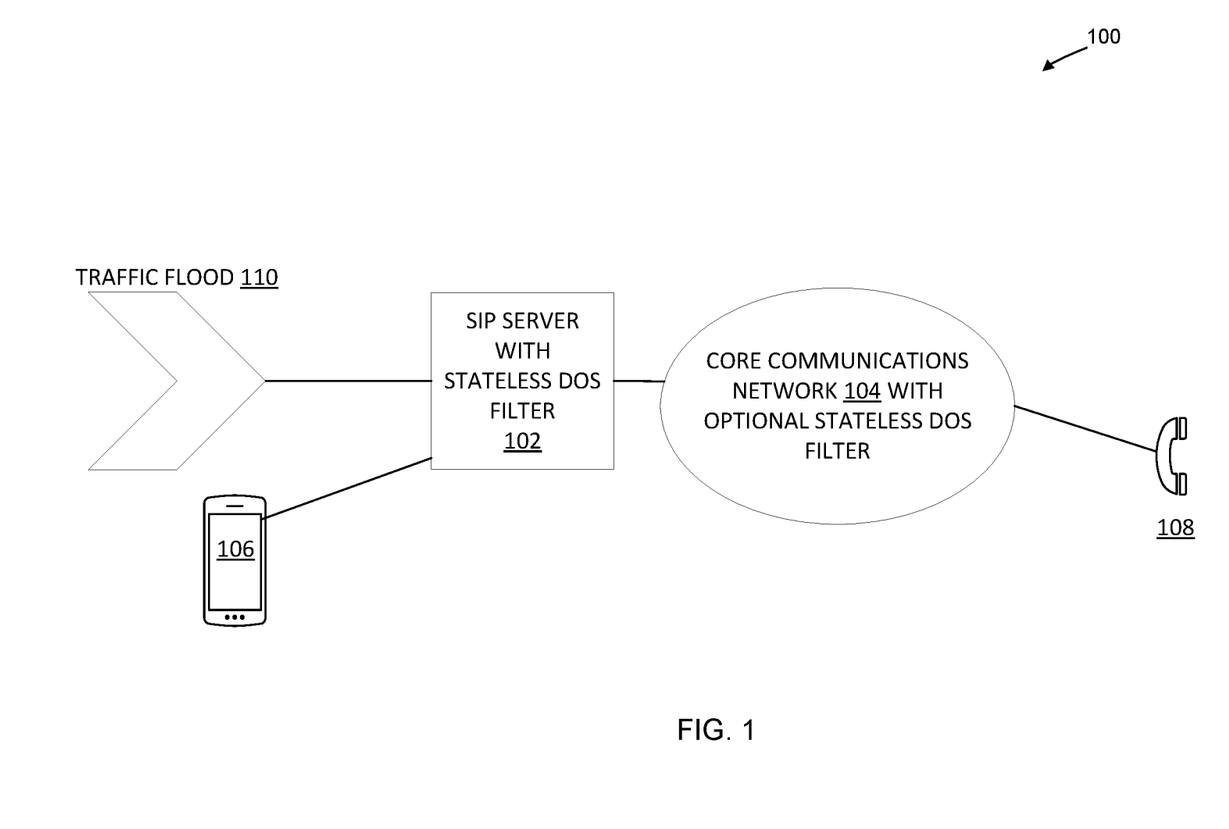
FIG. 1 is a schematic diagram of a SIP server with a stateless denial of service (DOS) filter deployed at an edge of a communications network.

FIG. 1 is a schematic diagram of a SIP server 102 with a stateless denial of service (DOS) filter deployed at an edge of a communications network 104. The communications network may be a fifth generation (5G) communications network. The term "edge" is used to refer to geographical proximity of a communications network node to an endpoint such as a mobile phone, laptop computer, desktop computer, wearable computer or other end user communications device. A communications network nodes is referred to as being at an edge of a communications network if it receives traffic before the core network.

The communications network 104 is a packet based communications network. The core of the communications network 104 comprises one or more data centers deploying telecommunications infrastructure, and/or comprises traditional hardware telecoms equipment such as VoIP switches, analogue switches, routers, optical fiber backbone networks, transmission lines, multiplexers, and other communications network nodes. Within the core of the communications network are communications network nodes storing subscriber credentials.

In the example of FIG. 1 two endpoints are shown, mobile phone 106 and land line phone 108 although in practice there are many thousands, hundreds of thousands or more endpoints. The mobile phone 106 is in communication with the SIP server 102 via a radio access network or cellular base station. The mobile phone 106 sends a SIP request to the SIP server 102 to request a SIP dialog be set up between itself and destination endpoint 108 (the land line phone), such as for a video call. The SIP server is experiencing a traffic flood 110 which is a large amount of incoming traffic from one or more other communications network nodes. The SIP server is in danger of becoming overwhelmed by the traffic flood 110 at which point it will be unable to function. The traffic flood 110 comprises huge numbers of SIP requests from one or more internet protocol IP addresses. The originating IP addresses may be spoofed or genuine. The SIP server is unable to easily determine which of the incoming SIP requests are genuine and which are malicious or illegitimate. The SIP server is able to use its stateless DoS filter to mitigate the DOS attack as described in more detail with reference to FIGS. 4 and 5 below.

The SIP server of the disclosure operates in an unconventional manner to achieve stateless DoS filtering of the disclosure.

By having the SIP server send a stateless challenge message to the sender it is possible to improve the functioning of the underlying communications network DoS since the challenge can be generated and responded to solely at the edge of the communications network. A stateless challenge message is formed using only data in the message being challenged, allowing it to be performed at the edge of the communications network. Any server is able to form a stateless challenge from a message rather than needing to do a lookup based on source or subscriber.

Alternatively, or in addition, the functionality of the SIP server described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
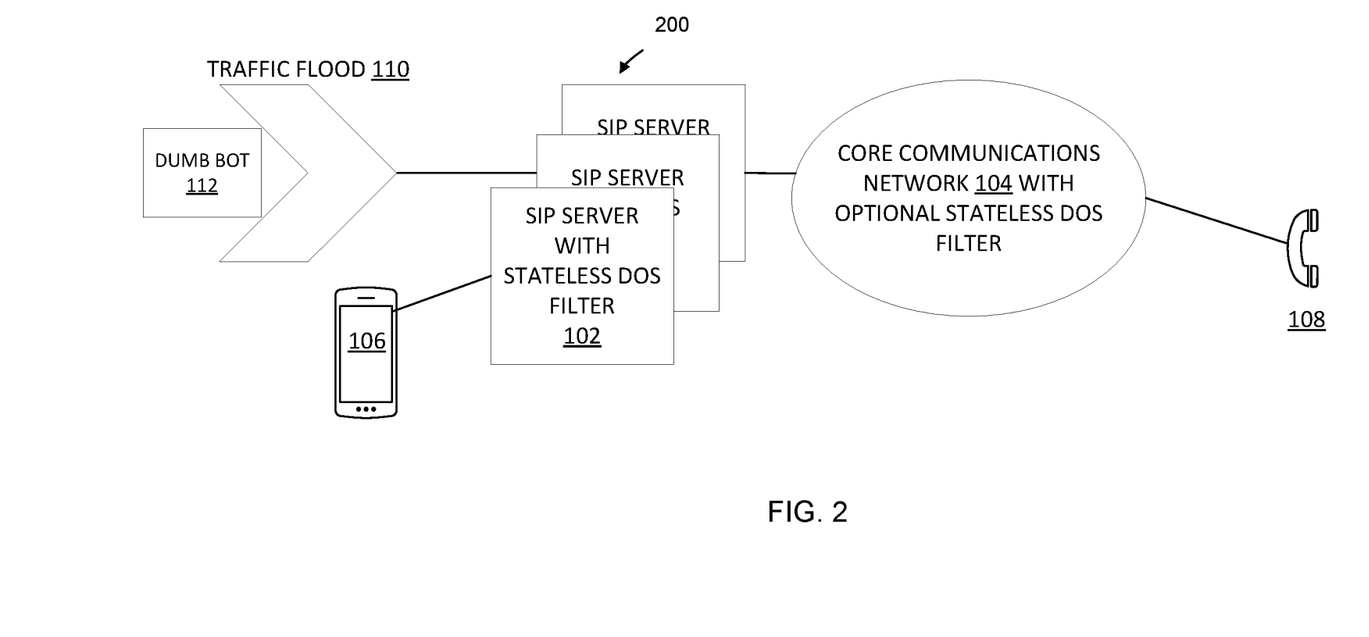
FIG. 2 is a schematic diagram of a plurality of SIP servers, each with a stateless denial of service (DOS) filter, and each deployed at an edge of a communications network.

FIG. 2 is a schematic diagram of a plurality of SIP servers 200, each with a stateless denial of service (DOS) filter, and each deployed at an edge of a communications network. The example of FIG. 2 is the same as that of FIG. 1 although there are more SIP servers 200 in FIG. 2. Where the SIP server 102 of FIG. 1 detects a traffic flood 110 beginning it is able to trigger instantiation of one or more other SIP servers 200 also deployed at the edge of the communications network 104. The traffic of the traffic flood 110 is load balanced between the SIP servers 200 using a load balancing mechanism. In an example the load balancing mechanism is a switch which switches the traffic of the traffic flood 110 between the SIP servers 200 in a round robin fashion or using another allocation rule. Each of the SIP servers 200 has a stateless DoS filter that implements the method of any of FIGS. 4 and 5. Thus it does not matter which traffic goes to which server making distributing the traffic efficient. Each of the individual SIP servers is able to trigger instantiation of one or more other SIP servers. Thus scalability is achieved in an effective and efficient manner. By using scalability in this way it is possible to allocate resources for mitigating traffic floods in a dynamic manner; once the traffic flood 110 ends the number of SIP servers 200 is reduced automatically. Individual ones of the SIP servers 200 monitor their workload and shut themselves down if their workload falls below a threshold.

Figure 3:
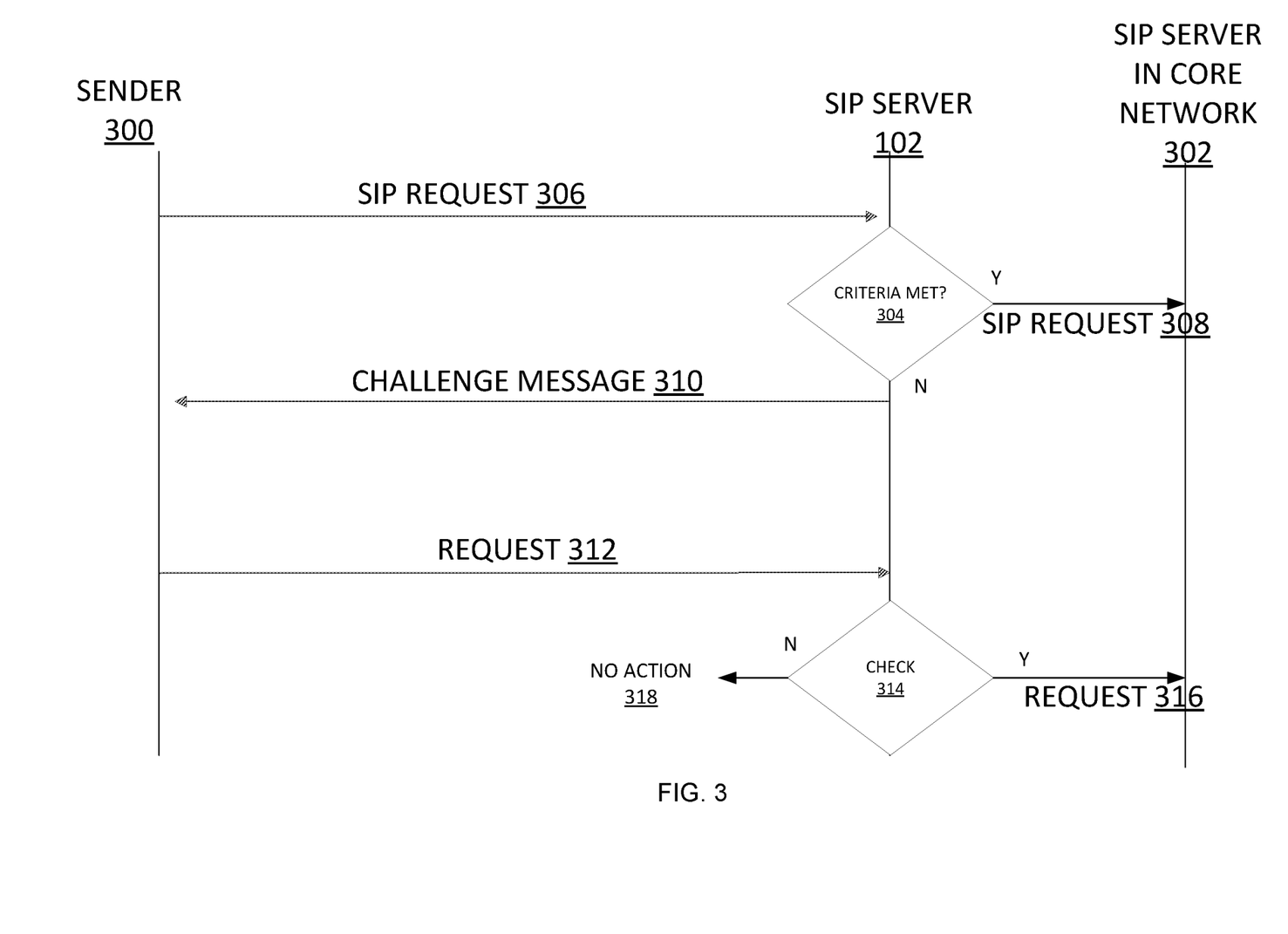
FIG. 3 is a message sequence chart showing use of a challenge message to mitigate denial of service attacks.

FIG. 3 is a message sequence chart showing use of a challenge message to mitigate denial of service attacks. FIG. 3 uses a vertical line to represent a sender 300 which is a sending endpoint of a SIP communications network such as mobile phone 106 of FIG. 1. FIG. 3 also represents a SIP server 102 (at an edge of a communications network) using a vertical line and also a SIP server 302 in a core of a communications network. SIP messages sent between the entities in FIG. 3 are represented by arrows and the chronological order of the messages is represented using the relative vertical positions of the arrows.

The sender 300 sends a SIP request 306 to SIP server 102. The SIP request is any type of SIP request message such as a dialog initiation request. Optionally the SIP server checks 304 whether criteria are met. If the criteria are met the SIP server 102 forwards the SIP request 308 towards a core of the communications network such as to a SIP server 302. The SIP server 302 optionally carries out a stateful DoS filtering process and the SIP request 308 may be used to establish a communications session with a destination end point, such as to set up a video call or other communications session.

If the criteria are not met at check 304 the SIP server 102 drops the SIP request message and applies a stateless DoS filter by forming a challenge message 310 and sending the challenge message to the sender 300. The challenge message comprises a token that is computed by the SIP server 102 from a cryptographic secret and a property of the SIP request 306.

The sender 300 receives the challenge message 310 and if the sender does not understand SIP or does not recognize the challenge message, it ignores the challenge message and takes no action. In some cases the sender does not receive the challenge message since it lied about its source address (in the case of malicious parties spoofing internet protocol addresses for example). Thus where the sender 300 is a dumb bot or other dumb device that does not understand SIP, or is a malicious party spoofing source IP addresses, the sender 300 takes no action in response to the challenge message 310. In this situation the SIP server receives no second request from the sender in reply to the challenge message 310. In response to non-receipt of the second request the SIP server 102 takes no action and mitigates the DOS attack in so doing.

Where the sender 300 has knowledge of SIP it sends a second request 312 in response to the challenge message 310 per the standard SIP protocol specifications as laid out in RFC3261. The second request 312 is sent from the sender 300 to the SIP server 102. The second request 312 is a request to establish the communication session. In response to receipt of the second request, the SIP server 102 checks 314 that the second request 312 comprises the token. If check 314 fails the SIP server takes no action 318, mitigating the DOS attack. If check 314 succeeds the second request is forwarded 316 to the SIP server 302 in the core communications network in order to set up a SIP dialog and/or undergo stateful DoS filtering.

At check 314 the SIP server 102 checks the second request 312 comprises the token. The check may comprise checking the second request 312 comprises the cryptographic secret since the token was formed using the cryptographic secret. By using a cryptographic secret it is difficult for malicious parties to form second requests 312 since they would need to guess the cryptographic secret. In some examples, checking the second request comprises the token comprises computing a second token from the cryptographic secret and a property of the response and comparing the second token with the token. If the second token and the token match the check is passed and the SIP request is forwarded 316. If the second token is different from the token the check fails and no action is taken 318. In some cases a cache is used by the SIP server. In this case checking 314 the second request comprises the token comprises retrieving a copy of the token from a cache and comparing the copy of the token with the token. The token is stored in the cache by the SIP server at the time when the SIP server 102 creates the challenge message 310. The cache optimizes performance; if the message goes to another server that is acceptable since the other server is able to recompute the token.

As mentioned above, the checking done at operation 314 is achieved in a stateless manner. That is, no information (such as user credentials) has to be retrieved from the core communications network. The check at operation 314 is able to go ahead using information already available at the SIP server and which does not have to be retrieved from another entity or done by forwarding the packet to an entity with more functionality. The operation of checking 314 the second request comprises the token is performed at an edge of the communications network optionally without accessing state comprising credentials of a user associated with the sending SIP endpoint. Credentials are typically stored in a core of the communications network. Because the checking operation 314 is stateless it is particularly efficient and scalable.

In some examples, computing the token from the cryptographic secret and a property of the request comprises, computing a hash of a property of the request and compositing the hash and the cryptographic secret. Compositing means concatenating or joining, or forming into a list or string. Any property of the request may be used and a non-exhaustive list of examples is: sending IP address, sending port number, destination IP address, destination port number, transport protocol, SIP method.

Forming the challenge message comprises forming a SIP message (that provokes a new request) and where the SIP message comprises the token. The token may be formed from the cryptographic secret and the address of the SIP endpoint. In this way, any server is able to compute the same token (whereas if the token is formed from the server's address and the cryptographic secret, each server would compute a different token). Take as an example the token generation algorithm of concatenating the internet protocol address of the SIP endpoint (referred to as endpoint IP) and the cryptographic secret. Using the endpoint IP, servers at 1.1.1.1 and 1.1.1.2 would come up with cryptographic secret+endpointIP. If a message went to server1, and it challenged it, the endpoint would send a new request with cryptographic secret+endpointIP. That could go to server 1 or 2; either of them would compute the token following the same method, come up with cryptographic secret+endpointIP again (assuming the endpoint IP hasn't changed), and okay the message.

Using the SIP server IP instead they would come up with cryptographic secret+1.1.1.1 and cryptographic secret+1.1.1.2 respectively. That would mean that if server 2 saw a new request caused by a challenge from server 1, thus containing cryptographic secret+1.1.1.1 in it, it would consider this a bad token and challenge again or drop.

In some examples, forming the challenge message comprises forming a SIP redirection response or a SIP client failure response.

In some examples the challenge message is a SIP 302 message; or a SIP 401 message comprising arbitrary credentials. A SIP 302 message is originally intended in the SIP protocol to be for situations where a communications network node has moved temporarily. When a SIP node receives a 302 message it knows it should try at the address in the Contact field of the SIP 302 message. In the present technology the inventors have recognized that a SIP 302 message can be used as part of a stateless DoS filtering process. This is achieved by adding in the Contact field of the SIP 302 message the token and the address of the SIP server (or a group of SIP servers in examples such as those of FIG. 2).

In an example a SIP 302 message has a Contact: header of form <sip:[user]@[server];[hash]>. In this the [server] is the address of the SIP server, so the second request should come back to it. The [hash] may be a hash (or SHA256) of the sender's IP and port, composited with the cryptographic secret to avoid attackers being able to predict it. Messages can be validated by checking for this hash as a parameter in the Request URI of a subsequent SIP request. Note that no state is needed for this, the SIP server (or another) can recalculate and thus verify the hash if it isn't cached. This approach will filter out spoofed source internet protocol addresses (eliminating a major class of distributed denial of service DDoS).

The inventors have recognized that another option is to use a SIP 401 message comprising incorrect credentials in order to create a stateless DoS filtering process. A SIP 401 message is a type of client failure response. When a SIP communications network node receives a SIP 401 message it knows it has received a SIP request which required user authentication and so it sends a response comprising user credentials. In the present technology, the response to the SIP 401 message is a request, modified to replace the user credentials by the token. Retrieving the user credentials from the core communications network would take too long and is not needed for the stateless DoS filtering.

At operation 314, where the check is successful the second request is forwarded towards the core communications network. In some cases the second request is forwarded 316 into another layer of checking where credentials of a user associated with the sender 300 is accessed.

Figure 4:
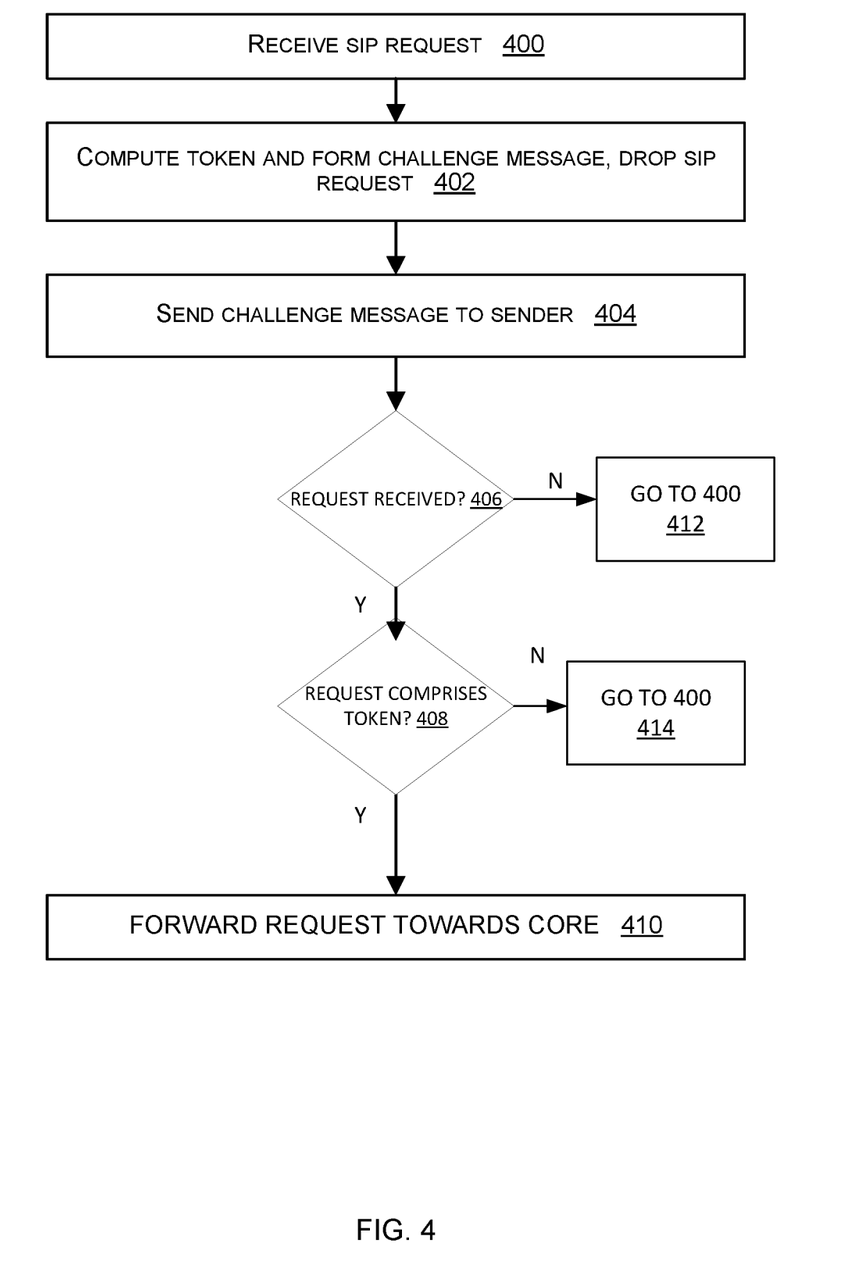
FIG. 4 is a flow diagram of a method performed by a stateless denial of service filter.

FIG. 4 is a flow diagram of a method performed by a stateless denial of service filter such as at a SIP server 102 of FIG. 1. A first SIP request is received 400 such as a SIP INVITE message or any other type of SIP request. The SIP server 102 receives the first SIP request and computes a token. The SIP server also drops the first SIP request. The token is computed from a cryptographic secret and a property of the first SIP request. In an example the cryptographic secret is a certificate or a key from a certification authority. The SIP server forms 402 a challenge message comprising the token and sends 404 the challenge message to the sender to trigger a second SIP request from the sender comprising the token. The second SIP request is a request for the same outcome as the first SIP request.

The SIP server carries out a first check 406 to see if a second request is received. There is no need for a timer such as to check if the second request is received within a specified time as that adds complexity. In response to non-receipt of the second request no action is taken by the SIP server and the method returns to operation 400. In response to receipt of the second request, a second check is carried out 408 to check if the second request comprises the token. If the second request does not comprise the token no action is taken and the method returns to operation 400. If the second request does comprise the token the second request is forwarded 410 towards the core of the communications network.

Figure 5:
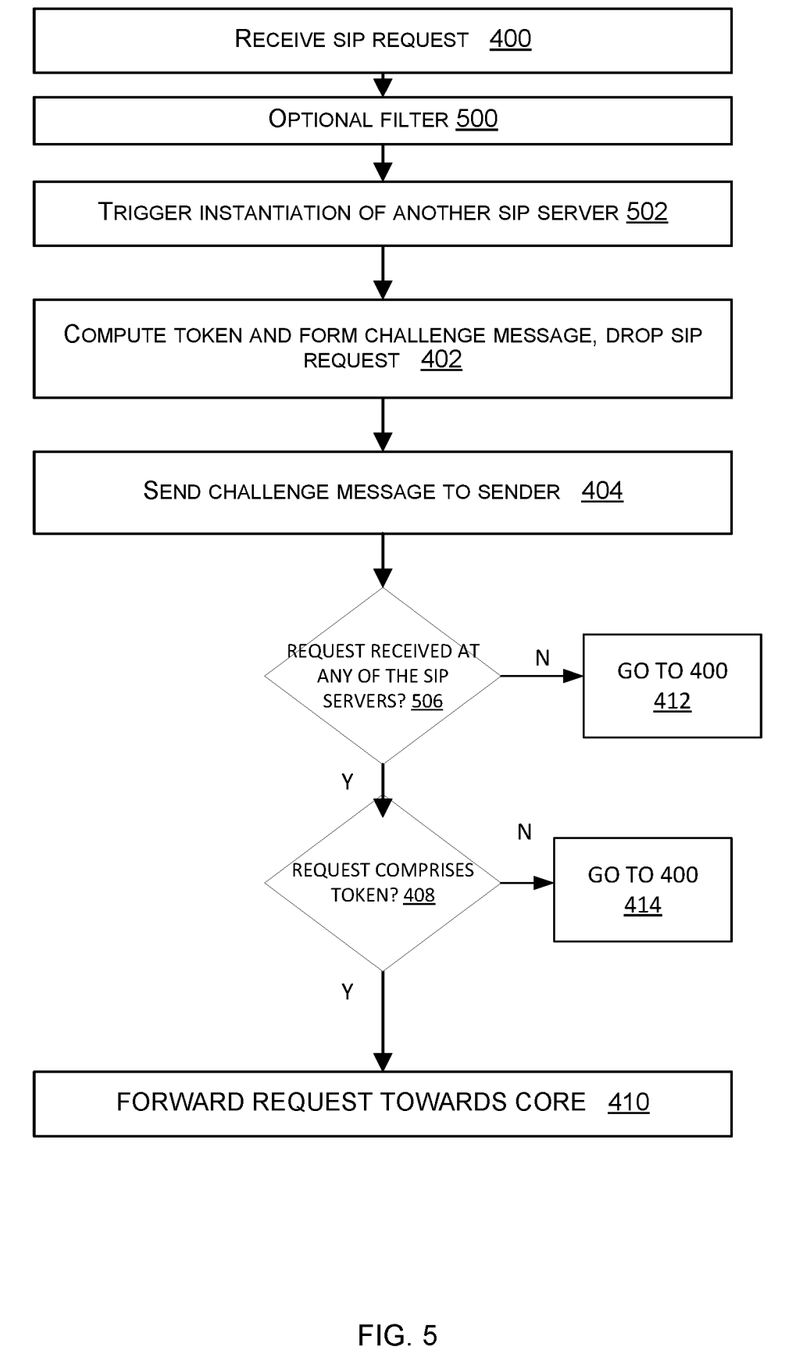
FIG. 5 is a flow diagram of another method performed by a stateless denial of service filter.

FIG. 5 is a flow diagram of another method performed by a stateless denial of service filter and where scalability is used to increase a number of SIP servers as in the deployment of FIG. 2. The method of FIG. 4 need not be applied arbitrarily to all traffic. It may be applied to only suspicious traffic, such as that from unexpected regions or at unexpected rates. This avoids outright banning those sources. A first SIP request is received 400 such as a SIP INVITE message or any other type of SIP request. The SIP server optionally filters 500 the first SIP request using stateless DoS filtering as described with reference to FIG. 4. That is, if the SIP server determines the first SIP request is from a source in a specified geographical area it applies the optional stateless DoS filtering. In another example, if the SIP server determines that a rate of receipt of first SIP requests has exceeded a threshold, the SIP server applies the optional stateless DoS filtering.

Suppose that at operation 500 the SIP server determines to carry out stateless DoS filtering. The SIP server optionally triggers 502 instantiation of another SIP server such as where a rate of receipt of SIP requests is above a threshold and/or where a capacity of the SIP server is below a threshold. To trigger 502 instantiation of another SIP server an instruction is sent to one or more neighboring communications network nodes. If a neighboring node with capacity receives the trigger it is caused to load and execute a virtual SIP server using a virtual machine or other suitable technology.

The SIP server 102 receives the first SIP request and computes a token. The token is computed from a cryptographic secret and a property of the first SIP request. In an example the cryptographic secret is a certificate or a key from a certification authority. The SIP server forms 402 a challenge message comprising the token and sends 404 the challenge message to the sender to trigger a second SIP request from the sender comprising the token. The sender is prompted by the challenge message to send a second SIP request to the address of the group of SIP servers 200 and the second SIP request reaches one of the SIP servers in the group. In an example, a load balancing mechanism sends the second request to one of the SIP servers in the group using a round robin allocation policy or any other allocation scheme.

In response to non-receipt of the second request no action is taken 412 and the method returns to operation 400. In response to receipt of the second request, a second check is carried out 408 to check if the second request comprises the token. If the second request does not comprise the token no action is taken 414 and the method returns to operation 400. If the second request does comprise the token the second request is forwarded 410 towards the core of the communications network.

Thus in some examples, in response to receiving more than a threshold number of requests to establish a communications session, a SIP server triggers instantiation of a second SIP server in the communications network, and wherein forming the challenge message comprises forming a SIP message comprising the token.

Figure 6:
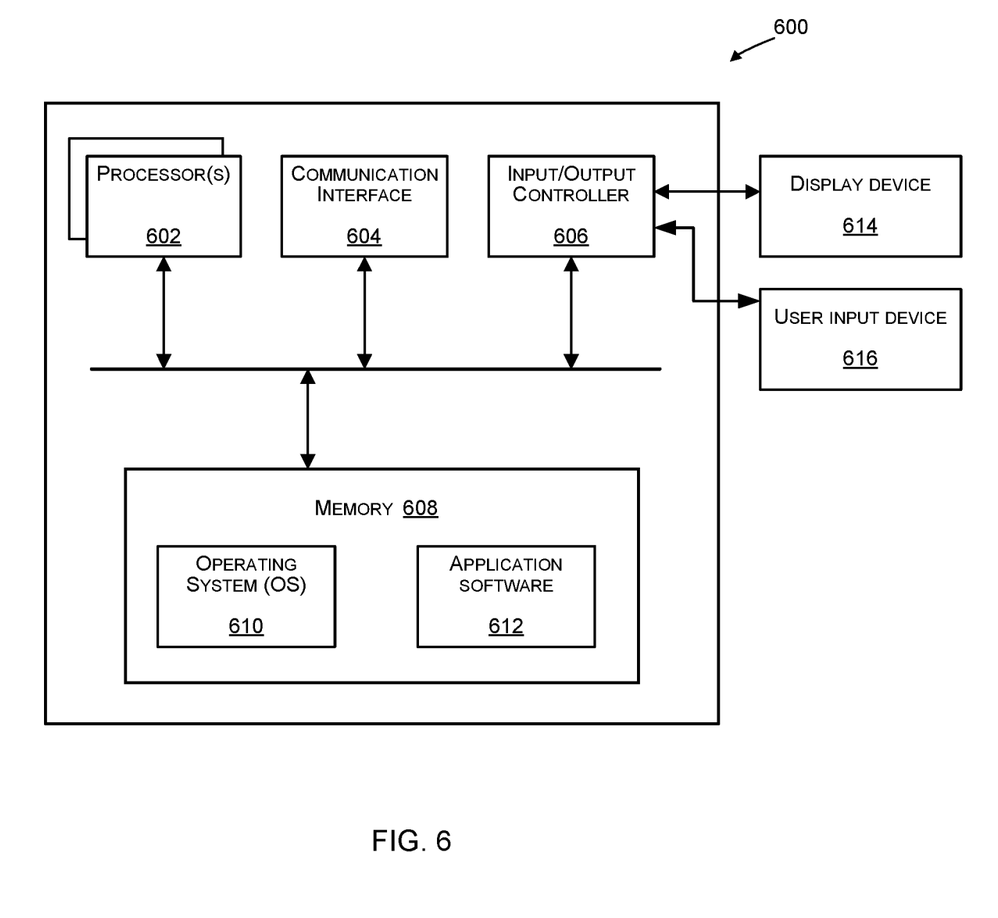
FIG. 6 illustrates an exemplary computing-based device used to form a SIP server with a stateless denial of service filter in some examples.

FIG. 6 illustrates an exemplary computing-based device used to form a SIP server with a stateless denial of service filter in some examples. The computing-based device 600 of FIG. 6 is a SIP communications network node of any suitable type such as a server, a compute node, a router, a switch or any other SIP communications network node suitable for use at an edge of a communications network.

Computing-based device 600 comprises one or more processors 602 which are microprocessors, controllers or any other suitable type of processors for processing computer executable instructions to control the operation of the device in order to carry out stateless DoS filtering such as by performing the methods of any of FIG. 3, 4 or 5. In some examples, for example where a system on a chip architecture is used, the processors 602 include one or more fixed function blocks (also referred to as accelerators) which implement a part of the method of any of FIG. 3, 4 or 5 in hardware (rather than software or firmware). Platform software comprising an operating system 610 or any other suitable platform software is provided at the computing-based device to enable application software 612 to be executed on the device.

The computer executable instructions are provided using any computer-readable media that is accessible by computing based device 600. Computer-readable media includes, for example, computer storage media such as memory 608 and communications media. Computer storage media, such as memory 608, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 608) is shown within the computing-based device 600 it will be appreciated that the storage is, in some examples, distributed or located remotely and accessed via a network or other communication link (e.g. using communication interface 604).

The computing-based device 600 also comprises an input/output controller 606 arranged to optionally output display information to a display device 614 which may be separate from or integral to the computing-based device 600. The display information may provide a graphical user interface. The input/output controller 606 is also arranged to receive and process input from one or more devices, such as a user input device 616 (e.g. a mouse, keyboard, camera, microphone or other sensor). In some examples the user input device 616 detects voice input, user gestures or other user actions and provides a natural user interface (NUI). This user input may be used to change thresholds, specify rules, view SIP request rates. In an embodiment the display device 614 also acts as the user input device 616 if it is a touch sensitive display device. The input/output controller 606 outputs data to devices other than the display device in some examples, e.g. a locally connected printing device.

Alternatively or in addition to the other examples described herein, examples include any combination of the following clauses.

Clause A. A computer-implemented method performed by a session initiation protocol SIP server in a communications network, the method comprising:
storing a cryptographic secret;
receiving, from a sending SIP endpoint in the communications network a request to establish a communications session with a destination SIP endpoint in the communications network;
dropping the request;
computing a token from the cryptographic secret and a property of the request;
forming a challenge message comprising the token;
sending the challenge message to the sender to trigger a second request from the sender, the second request being to establish the communications session and comprising the token;
in response to receipt of the second request, checking the second request comprises the token; and
only in response to success of the checking, forwarding the second request towards a core of the communications network.

Clause B. The method of clause A wherein checking the second request comprises the token comprises checking the response comprises the cryptographic secret.

Clause C. The method of any preceding clause wherein checking the second request comprises the token comprises computing a second token from the cryptographic secret and a property of the second request and comparing the second token with the token.

Clause D. The method of any preceding clause wherein checking the second request comprises the token comprises retrieving a copy of the token from a cache and comparing the copy of the token with the token.

Clause E. The method of any preceding clause wherein checking the second request comprises the token is achieved in a stateless manner.

Clause F. The method of any preceding clause wherein checking the second request comprises the token is performed at an edge of the communications network optionally without accessing state comprising credentials of a user associated with the sending SIP endpoint from a core of the communications network.

Clause G. The method of any preceding clause wherein computing the token from the cryptographic secret and a property of the request comprises, computing a hash of a property of the request and compositing the hash and the cryptographic secret.

Clause H. The method of any preceding clause wherein forming the challenge message comprises forming a SIP message comprising the token.

Clause I. The method of any preceding clause wherein forming the challenge message comprises forming a SIP redirection response or a SIP client failure response.

Clause J. The method of any preceding clause wherein forming the challenge message comprises forming a SIP 302 message.

Clause K. The method of any preceding clause wherein forming the challenge message comprises forming a SIP 401 message.

Clause L. The method of any preceding clause comprising, in response to success of the checking, forwarding the second request towards a core of the communications network and into another layer of checking where credentials of a user associated with the sending SIP endpoint is accessed.

Clause M. The method of any preceding clause comprising, prior to computing the token, filtering the request, and in response to the request passing the filtering proceeding with the method of claim 1; otherwise not proceeding with the method of claim 1.

Clause N. The method of any preceding clause comprising, in response to receiving more than a threshold number of requests to establish a communications session, triggering instantiation of a second SIP server in the communications network, and wherein forming the challenge message comprises forming a SIP message comprising the token.

Clause O. An apparatus comprising:
a processor;
a memory storing instructions that, when executed by the processor, perform a method comprising:
storing a cryptographic secret;
receiving, from a sending SIP endpoint in a communications network a request to establish a communications session with a destination SIP endpoint in the communications network;
computing a token from the cryptographic secret and a property of the request;
dropping the request;
forming a challenge message comprising the token;
sending the challenge message to the sender to trigger a second request from the sender, the second request being to establish the communications session and comprising the token.

Clause P. A communications network comprising:
a plurality of session initiation protocol, SIP, servers;
each of the SIP servers comprising:
a processor;
a memory storing instructions that, when executed by the processor, perform a method comprising:
storing a cryptographic secret;
receiving, from a sending SIP endpoint in a communications network a request to establish a communications session with a destination SIP endpoint in the communications network;
computing a token from the cryptographic secret and a property of the request;
dropping the request;
forming a challenge message comprising the token;
sending the challenge message to the sender to trigger a second request from the sender, the second request being to establish the communications session and comprising the token.

Clause Q. The communications network of clause P wherein the SIP servers are at an edge of the communications network.

Clause R. The communications network of clause P or Q wherein in response to receipt of the second request at any of the SIP servers, checking the second request comprises the token and in response to failure of the checking taking no action.

Clause S. The communications network of clause R wherein in response to success of the checking, forwarding the second request towards a core of the communications network.

Clause T. The communications network of any of clauses P to S wherein the challenge message is a SIP 302 message.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method performed by a session initiation protocol (SIP) server in a communications network, the method comprising:
storing a cryptographic secret;
receiving, from a sending SIP endpoint in the communications network, a request to establish a communications session with a destination SIP endpoint in the communications network;
dropping the request;
computing a token from the cryptographic secret and a property of the request;
forming a challenge message comprising the token;
sending the challenge message to the sending SIP endpoint to trigger a second request from the sending SIP endpoint, the second request being to establish the communications session and comprising the token;
subsequent to receiving the second request, checking that the second request comprises the token; and
only in response to success of the checking, forwarding the second request to a core of the communications network and performing an additional layer of checking where credentials of a user associated with the sending SIP endpoint is accessed.

2. The method of claim 1 wherein checking the second request comprises the token comprises checking the response comprises the cryptographic secret.

3. The method of claim 1 wherein checking the second request comprises the token comprises computing a second token from the cryptographic secret and a property of the second request and comparing the second token with the token.

4. The method of claim 1 wherein checking the second request comprises the token comprises retrieving a copy of the token from a cache and comparing the copy of the token with the token.

5. The method of claim 1 wherein checking the second request comprises the token is achieved in a stateless manner.

6. The method of claim 1 wherein the communications network is a 5G communications network and wherein checking the second request comprises the token is performed at an edge of the 5G communications network optionally without accessing state comprising credentials of a user associated with the sending SIP endpoint from a core of the communications network.

7. The method of claim 1 wherein computing the token from the cryptographic secret and a property of the request comprises computing a hash of a property of the request and compositing the hash and the cryptographic secret.

8. The method of claim 1 wherein forming the challenge message comprises forming a SIP message comprising the token.

9. The method of claim 1 wherein forming the challenge message comprises forming a SIP redirection response or a SIP client failure response.

10. The method of claim 1 wherein forming the challenge message comprises forming a SIP 302 message.

11. The method of claim 1 wherein forming the challenge message comprises forming a SIP 401 message.

12. The method of claim 1, further comprising:
prior to computing the token, filtering the request; and
verifying that the request passes the filtering.

13. The method of claim 1, further comprising, in response to receiving more than a threshold number of requests to establish a communications session, triggering instantiation of a second SIP server in the communications network, and wherein forming the challenge message comprises forming a SIP message comprising the token.

14. An apparatus comprising:
a processor;
a memory storing instructions that, when executed by the processor, perform a method comprising:
storing a cryptographic secret;
receiving, from a sending session initiation protocol (SIP) endpoint in a communications network a request to establish a communications session with a destination SIP endpoint in the communications network;
computing a token from the cryptographic secret and a property of the request;
dropping the request;
forming a challenge message comprising the token;
sending the challenge message to the sending SIP endpoint to trigger a second request from the sending SIP endpoint, the second request being to establish the communications session and comprising the token; and
subsequent to determining that more than a threshold number of requests to establish a communications session have been received, triggering instantiation of a second SIP server in the communications network, wherein forming the challenge message comprises forming a SIP message comprising the token.

15. A communications network comprising:
a plurality of session initiation protocol (SIP) servers;
each of the SIP servers comprising:
a processor;
a memory storing instructions that, when executed by the processor, perform a method comprising:
storing a cryptographic secret;
receiving, from a sending SIP endpoint in a communications network a request to establish a communications session with a destination SIP endpoint in the communications network;
computing a token from the cryptographic secret and a property of the request;
dropping the request;
forming a challenge message comprising the token;
sending the challenge message to the sending SIP endpoint to trigger a second request from the sending SIP endpoint, the second request being to establish the communications session and comprising the token; and
subsequent to determining that more than a threshold number of requests to establish a communications session have been received, triggering instantiation of a second SIP server in the communications network, wherein forming the challenge message comprises forming a SIP message comprising the token.

16. The communications network of claim 15 wherein the SIP servers are at an edge of the communications network.

17. The communications network of claim 15 wherein in response to receipt of the second request at any of the SIP servers, checking the second request comprises the token and in response to failure of the checking taking no action.

18. The communications network of claim 17 wherein in response to success of the checking, forwarding the second request towards a core of the communications network.

19. The communications network of claim 15 wherein the challenge message is a SIP 302 message.

* * * * *